United States Patent [19]
Blackman et al.

[11] Patent Number: 4,472,703
[45] Date of Patent: Sep. 18, 1984

[54] FIELD COIL INSULATION SHIELD

[75] Inventors: David R. Blackman, Vermilion; Gregory S. Wilhelm, Fremont, both of Ohio

[73] Assignee: Allied Corporation, Morris Township, Morris County, N.J.

[21] Appl. No.: 568,550

[22] Filed: Jan. 5, 1984

[51] Int. Cl.³ .................................................. H01F 27/30
[52] U.S. Cl. ................................... 336/209; 336/206; 336/196; 310/45
[58] Field of Search ............... 336/196, 197, 206, 207; 310/45, 194, 214; 229/45 R; 206/395, 396, 397

[56] References Cited

U.S. PATENT DOCUMENTS

| | | | |
|---|---|---|---|
| 1,797,768 | 3/1931 | Goad | 336/209 |
| 2,217,397 | 10/1940 | Armitt | 206/395 |
| 4,160,967 | 7/1979 | Beech | 336/209 |
| 4,222,023 | 9/1980 | Beech | 336/209 |

Primary Examiner—J. V. Truhe
Assistant Examiner—Susan Steward
Attorney, Agent, or Firm—James P. DeClercq

[57] ABSTRACT

A field coil insulation shield for a motor or generator is made of a single sheet of insulating material, and defines portions which substitute for the paper insulator conventionally disposed around a field pole and between a field coil and a motor frame, and portions which substitute for individual wrappings with tape to form the field coil and to protect it from the structure of the field pole which holds it in position. The portions which substitute for a wrapping of tape are provided with elongated projections which are latchingly received around the edge of a central aperture, through which the field pole passes.

2 Claims, 5 Drawing Figures

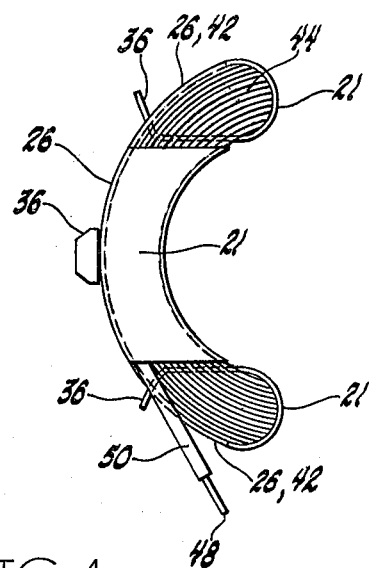
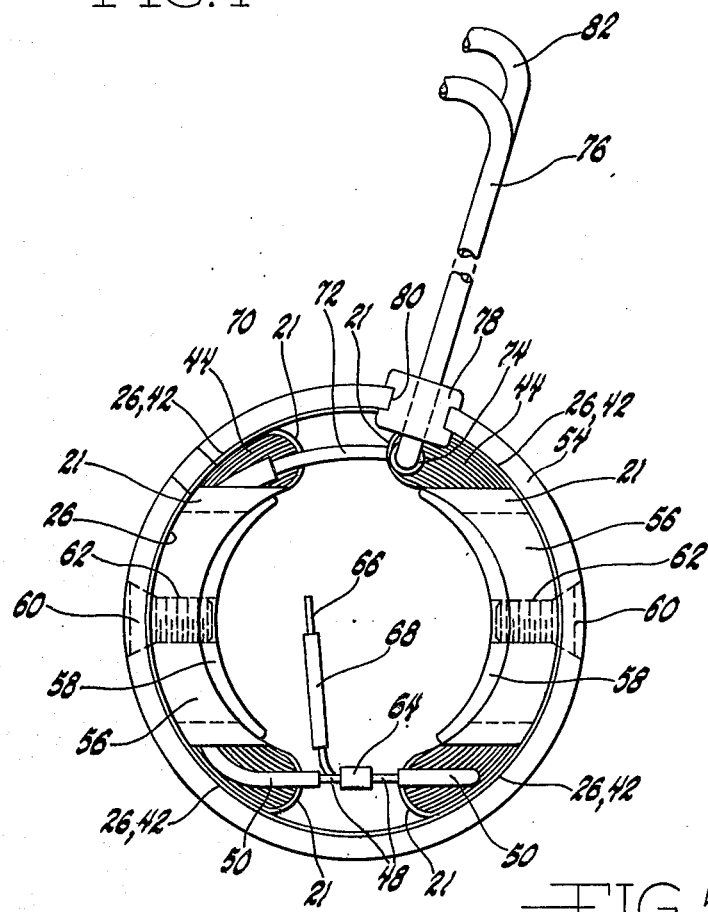

FIELD COIL INSULATION SHIELD

The instant application relates to the field of dynamoelectric machines. In particular, the application relates to a shield or insulator for protecting a wound field coil of a dynamoelectric machine.

BACKGROUND OF THE INVENTION

In dynamoelectric machines such as motors and generators, the stationary field which interacts with the rotatable armature to convert electrical energy to mechanical energy, or to convert mechanical energy to electrical energy, is provided by coils of wire, known as field coils, which are disposed about field poles, for concentrating and directing the magnetic flux produced by the field coils. Field poles are generally configured as including a pole shoe, which has a concave contour matching the contour of the exterior of the armature, and overhangs the field coil, for trapping the field coil between the pole shoe and the motor frame to retain it in place. It has long been conventional to place a piece of insulating material having a generally rectangular outer periphery around the pole piece and against the motor frame, to protect the field coil from abrasion against the motor frame, and also to provide protection for the sides of the generally-rectangular field coils, to protect them from abrasion against the shoe portion of the pole piece and the sides of the pole piece. This is conventionally done by wrapping the coil with tape, even though one-piece insulators for field coils have long been known, such as that described in U.S. Pat. No. 1,797,768, issued to L. C. Goad on Mar. 24, 1931. Although functional, such structures have been difficult to produce properly and repeatedly, or have been inconvenient to use, and so have not found commercial acceptance.

The instant invention overcomes these and other deficiencies of the prior art.

SUMMARY OF THE INVENTION

The instant invention provides a field coil insulation shield which is easy to fabricate and use, and which may be used to properly form or shape fine-wire coils, as well as to insulate and protect field coils made of larger wire sizes, and which may be applied to a field coil either before or after it is deformed to conform to the inner surface of a motor frame.

Thus, it is an object of the invention to provide a simplified unitary replacement for the prior art technique which utilized tape to form and protect the coil wires and a paper member to shield and insulate the coil from the motor frame.

It is a feature of the invention that an insulation shield is comprised of a sheet of insulative material having a shield body of generally rectangular geometry with rounded corners and with a centrally located generally rectangular aperture. Four arms or the like with locking tabs extend from the four sides of the shield body, the locking tabs being adapted to engage slots in the shield body adjacent the rectangular aperture when the shield is wrapped around the field coil.

It is an advantage of the invention that a single, easy-to-make and easy-to-use insulating member may be quickly installed by hand, or with the use of simple hand tools. Thus, as will be apparent, the preferred embodiment of the instant invention provides a field coil shield made of a sheet of insulating material, the sheet of insulating material defining a central generally rectangular aperture having rounded corners and four inwardly-facing edge portions, each including a centrally-disposed inwardly-facing projection defining a slot, and having a profile defined by a rectangular portion extending outward from each edge of the central aperture, each rectangular portion having first and second side portions, a base portion adjacent the central aperture, and an end portion, each end portion having a centrally-located outwardly-extending elongated projection having a pointed tip portion and a base portion including a transverse latching projection, defining a notch adjacent the end portion, the rectangular portions having their base portions connected by arcuate portions, such that the base portions and the arcuate portions are adapted to insulate the field coil from a mounting surface, and each elongated projection is adapted to latchingly engage the slots adjacent the central aperture and thus cover respective portions of the field coil and insulate each portion from a pole piece retaining it in place.

Other objectives, features and advantages of the invention will become apparent from the detailed description which follows.

BRIEF DESCRIPTION OF THE DRAWINGS

FIG. 4 is a side elevational view of a field coil provided with a field coil insulation shield according to the invention after it is deformed to conform to a motor frame.

FIG. 5 is an illustration depicting the installation of field coils such as shown in FIGS. 2-4 in a motor or generator frame.

DETAILED DESCRIPTION OF THE INVENTION

Figure 1:
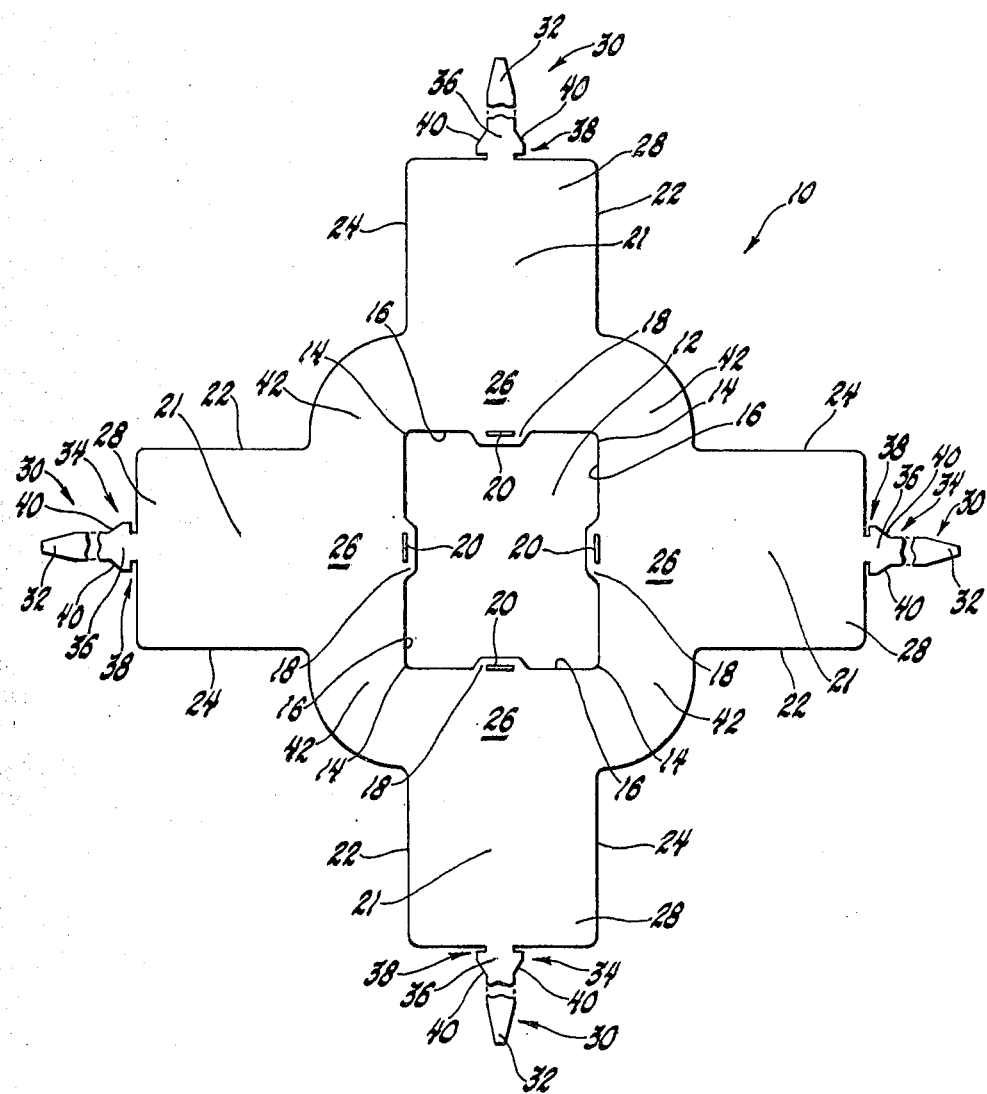
FIG. 1 is a plan view showing the outline of a field coil insulation shield according to the preferred embodiment of the invention.

Referring first to FIG. 1, it can be seen that a field coil insulation shield 10 according to the preferred embodiment of the invention is composed of a sheet of insulating material defining a central generally rectangular aperture 12 having four rounded corners 14 and four inwardly-facing edge portions 16, each edge portion 16 including a centrally-disposed inwardly-facing projection 18, and each projection 18 defining a slot 20 therein extending parallel to edge portion 16. A generally rectangular portion 21 extends outwardly from each said edge portion 16, each rectangular portion having first and second side portions 22, 24, a base portion 26 and an end portion 28. Each end portion 28 includes a centrally-located, outwardly-extending elongated projection 30, each having a pointed tip portion 32 and a base portion 34 including a transverse projection portion 36 defining a notch 38 adjacent each end portion 28. As will be apparent, each elongated projection 30 may be made as long as desired, and, preferably, transverse projection 36 has outwardly tapered leading edges 40.

As illustrated, each rectangular portion is connected to an adjacent rectangular portion by an integral arcuate portion 42.

As can be seen, insulation shield 10 includes a portion composed of base portions 26 and arcuate portions 42 similar in shape to the paper insulating member commonly placed around a field pole, to shield and protect it from contact with the motor or generator frame or housing, and, when each elongated projection 30 is inserted into and pulled through its respective slot 20 over a field coil disposed on base portions 26 and arcuate portions 42, the part of the rectangular portion bounded by first and second side portions 22, 24, serves the function presently served by a wrapping of tape in forming the coil, and insulating the coil from the metallic field pole structure.

As will be apparent, the illustrated embodiment of the invention is suitable for use with rectangular pole pieces. However, it is believed that some large dynamoelectric machines are made with circular pole pieces. The invention illustrated may easily be modified for use in such machines, if desired.

Figure 2:
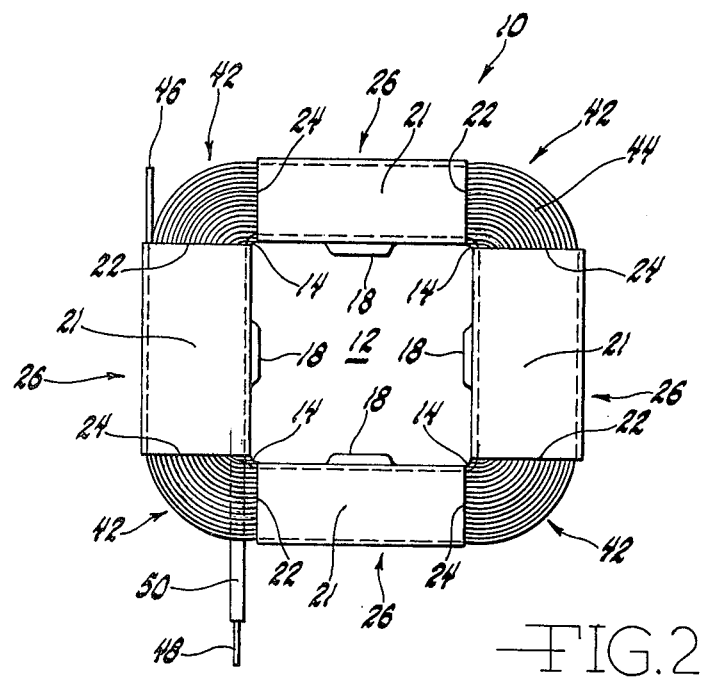
FIG. 2 is a top elevational view showing a field coil insulation shield according to the preferred embodiment of the invention after application to a field coil.

Turning now to FIG. 2, a field coil insulation shield 10 according to the preferred embodiment of the invention may be seen disposed about a field coil composed of a plurality of turns of wire. As conventional, field coil 44 has a first end 46, and a second end 48, covered with a tubular piece of insulation 50, since it extends from the inside or start of the winding.

Figure 3:
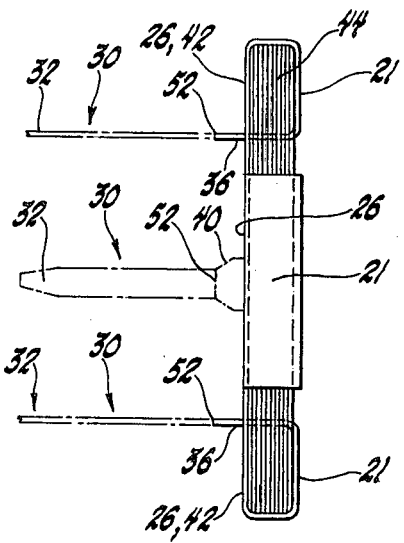
FIG. 3 is a side elevational view of FIG. 2.

In FIG. 3, first and second ends 46 and 48 have been omitted for clarity. As can be seen in FIG. 3, elongated projections 30 have been pulled through slots 20, and severed at line 52, the remainder of elongated projections 30 being illustrated in phantom lines. Severing the elongated projections at line 52, adjacent transverse projection portion 36, is desirable, but is not necessary, provided that elongated portions 30 are not permitted to interfere with the mechanical contact between the motor frame and pole pieces, since any spacing between the motor frame and pole piece increases the magnetic reluctance of the magnetic path through the poles of the motor or generator.

Turning now to FIG. 4, the assembly of field coil 44 and insulation shield 10 is shown formed in a shape appropriate for insertion in a motor frame or housing.

In FIG. 5, a pair of assemblies such as shown in FIG. 4 are shown installed in a motor or generator frame 54, as appropriate for a series-connected two pole dynamoelectric machine. The connections necessary for a shunt, compound, split-series or balanced series configuration will be obvious to one skilled in the art. As can be seen, each field coil 44 is retained in place by a field pole 56 including a pole shoe portion 58 which serves to hold each field coil 44, protected by field coil insulation shield 10 in position. The field poles themselves are held within motor frame 54 by fastening means shown as screws 60 passing through frame 54 and engaging threaded bores 62 in field poles 56. As shown in FIG. 5, second ends 48 of each of the two illustrated field coils 44 are joined at a splice 64 to a wire 66, provided with a section of insulation 68. Wire 66 is intended to be connected to a brush or slip ring of a motor or generator. First end 46 of one field winding 44 is shown joined at a splice 70 to a jumper wire 72, which joins an end 46 of the second field coil 44 at a splice 74, which connects both first ends 46 to a lead wire 76, passing through frame 54 at grommet 78 in aperture 80. A second lead wire 82 also passes through grommet 78, and has an end, not shown, for connection to a second brush or slip ring contact, not shown, in a motor or generator.

Numerous modifications and variations of the invention, including various nonsymmetries in the illustrated embodiment of the invention and various modifications to the precise structure of the elongated projections and the slots into which they are received will be apparent to one skilled in the art, and may be easily made without departing from the spirit and scope of the invention.

We claim:

1. A field coil shield, comprising:

a sheet of insulating material;

said sheet of insulating material defining a central generally rectangular aperture therein;

said generally rectangular aperture having rounded corners and four inwardly-facing edge portions, each said edge portion including a centrally-disposed inwardly-facing projection therefrom, each said projection defining a slot therein;

a rectangular portion of said sheet of insulating material extending outwardly from each said edge portion of said central aperture, each said rectangular portion having first and second side portions, a first base portion and an end portion;

each said end portion having a centrally-located outwardly-extending elongated projection therefrom;

each said elongated projection having a pointed tip portion and a second base portion, said second base portion including a transverse projection therefrom, said transverse portion defining a notch adjacent said end portion;

said rectangular portions being interconnected adjacent said central portion by arcuate portions integral with said first base portions;

said first base portions and said arcuate portions being adapted to insulate said field coil from a mounting surface;

each said elongated projection being adapted to engage a respective said slot with said transverse projections latchingly engaging said slot, and to cover respective portions of said field coil and insulate each said respective portion of said field coil from a pole piece retaining said field coil adjacent said mounting surface.

2. A field coil shield, comprising:

a sheet of insulating material;

said sheet of insulating material defining a central aperture therein;

said aperture having a plurality of inwardly-facing edge portions, each said edge portion including a centrally-disposed inwardly-facing projection therefrom, each said projection defining a slot therein;

a portion of said sheet of insulating material extending outwardly from each said edge portion of said central aperture, each said portion having first and second side portions, a first base portion and an end portion;

each said end portion having a centrally-located outwardly-extending elongated projection therefrom;

each said elongated projection having a pointed tip portion and a second base portion, said second base portion including a transverse projection therefrom, said transverse portion defining a notch adjacent said end portion;

said portions being interconnected adjacent said central portion by arcuate portions integral with said first base portions;

said first base portions and said arcuate portions being adapted to insulate said field coil from a mounting surface;

each said elongated projection being adapted to engage a respective said slot with said transverse projections latchingly engaging said slot, and to cover respective portions of said field coil and insulate each said respective portion of said field coil from a pole piece retaining said field coil adjacent said mounting surface.

* * * * *